US012068494B2

(12) United States Patent
Schmehl

(10) Patent No.: US 12,068,494 B2
(45) Date of Patent: Aug. 20, 2024

(54) BATTERY PACK

(71) Applicant: Robert Bosch GmbH, Stuttgart (DE)

(72) Inventor: Florian Schmehl, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 17/536,346

(22) Filed: Nov. 29, 2021

(65) Prior Publication Data

US 2022/0200089 A1 Jun. 23, 2022

(30) Foreign Application Priority Data

Dec. 17, 2020 (DE) ...................... 10 2020 216 146.1

(51) Int. Cl.
*H01M 50/236* (2021.01)
*H01M 50/213* (2021.01)
*H01M 50/247* (2021.01)

(52) U.S. Cl.
CPC ....... *H01M 50/236* (2021.01); *H01M 50/213* (2021.01); *H01M 50/247* (2021.01); *H01M 2220/30* (2013.01)

(58) Field of Classification Search
CPC ............. H01M 50/236; H01M 50/213; H01M 50/247; H01M 50/264; H01M 50/258; H01M 50/262; H01M 50/289; H01M 2220/30; Y02E 60/10
See application file for complete search history.

(56) References Cited

U.S. PATENT DOCUMENTS

2016/0043357 A1* 2/2016 Aida .................... H02J 7/0042
429/7
2018/0361874 A1 12/2018 Kobayashi et al.

FOREIGN PATENT DOCUMENTS

| DE | 10 2007 049 358 A1 | 4/2009 | |
|---|---|---|---|
| DE | 102007049358 | * 4/2009 | .......... H01M 10/613 |
| DE | 10 2014 217 992 A1 | 3/2016 | |
| DE | 10 2017 107 868 A1 | 10/2018 | |

* cited by examiner

*Primary Examiner* — Kiran Quraishi Akhtar
(74) *Attorney, Agent, or Firm* — Maginot, Moore & Beck LLP

(57) ABSTRACT

The disclosure describes a battery pack including at least one battery cell, an outer housing that has at least one first housing element, and a cell holder configured to receive the at least one battery cell. In this case the first housing element is constituted by a two-component part that includes at least one first hard component element, one second hard component element and at least one soft component element, the first hard component element and the second hard component element fixedly connected to each other via the at least one soft component element.

12 Claims, 8 Drawing Sheets

BATTERY PACK

This application claims priority under 35 U.S.C. § 119 to patent application no. DE 10 2020 216 146.1, filed on Dec. 17, 2020 in Germany, the disclosure of which is incorporated herein by reference in its entirety.

The present disclosure relates to a battery pack, in particular a battery pack for hand-held power tools.

BACKGROUND

Battery-operated hand-held power tools are preferably equipped with battery packs that are realized as interchangeable battery packs. The battery packs have one or more battery cells such as, for example, lithium-ion battery cells. In the case of battery packs for hand-held power tools, there is widespread use of cylindrically shaped battery cells, although alternative cell shapes, e.g. prismatic cells, may also be used. The diameters and lengths of these cylindrical battery cells often have manufacturer-specific and type-specific tolerances, such that the housing components of the battery packs must be designed for a relatively wide range of dimensions. At the same time, the battery cells must be inserted and fixed in the housing components in such a manner that damage to the battery cells, and to the electrical and electronic parts connected to the battery cells, is avoided. In order to compensate for tolerances in the dimensions of the battery cells, in the prior art elastic components or inserts are used, which are clamped between adjacent battery cells or between battery cells and housing components, as described for example in DE 10 2007 049 358 A1.

SUMMARY

The disclosure is based on a battery pack, in particular a battery pack for hand-held power tools, comprising at least one battery cell, an outer housing that has at least one first housing element, and a cell holder designed to receive the at least one battery cell. It is proposed that the first housing element be constituted by a two-component part that comprises at least one first hard component element, one second hard component element and at least one soft component element, the first hard component element and the second hard component element being fixedly connected to each other via the at least one soft component element.

The first housing element, realized as a two-component part, constitutes an integrated part. In assembling of the battery pack, the two-component part is assembled as one part. In particular, in assembling of the battery pack, the hard component elements and the soft component element are not assembled as individual elements. Further, the two hard component elements and the soft component element are fixedly connected to each other, preferably in a materially bonded manner. In particular, the two-component part may be produced by bi-injection molding. In the case of normal use of the battery pack, e.g. when the battery pack is operated with a hand-held power tool, separation of the hard and soft component elements is not envisaged. The use of a two-component part simplifies the assembling of the battery pack, as the number of parts to be assembled is reduced. At the same time, errors in the positioning of separately fitted elastic elements are avoided.

The at least two hard component elements are made, in particular, of a hard plastic such as, for example, acrylonitrile butadiene styrene (ABS), polycarbonate (PC), polyethylene (PE), polypropylene (PP), polyamide (PA), polybutylene terephthalate (PBT) or mixtures of the above plastics such as, for example, polycarbonate and acrylonitrile butadiene styrene. The plastic may also be a fiber-reinforced plastic of the aforementioned plastics. The at least one soft component element is made, in particular, of a soft elastic plastic, for example thermoplastic elastomers such as thermoplastic styrene block copolymers (TPS), urethane-based thermoplastic elastomers (TPU) or thermoplastic vulcanizates (TPV). Compared to the hard component elements, the soft component element is characterized, in particular, by a greater elasticity. The two hard component elements are elastically connected to each other via the soft component element in such a manner that relative movement of one hard component element with respect to the other hard component element is possible. The movement capability of one hard component element relative to the other hard component element makes it possible to compensate for tolerances in the dimensions of the battery cells.

The battery pack according to the disclosure has an outer housing that comprises at least the first housing element. An outer housing is to be understood to mean a housing that constitutes an outer surface of the battery pack. The outer housing surrounds the at least one battery cell and other electrical, electronic and/or mechanical parts of the battery pack. The outer housing preferably has at least one second housing element that is connected to the first housing element.

The first housing element and the second housing element in this case together constitute the outer housing. They may be detachably connected to each other by, for example, a screwed connection or a snap connection, or latching connection. In this design of the battery pack, the first and the second housing element are connected to each other in such a manner that the at least one battery cell or, in the case of a plurality of battery cells, all the battery cells are held under preload in the outer housing by means of the at least one soft component element. The first housing element, embodied as a two-component part, makes it possible in this case to generate a preload on the battery cells in a simple manner, as a result of which the battery cells achieve a stable positioning in the housing. Differences in the dimensions of the battery cells due to tolerances can thus be compensated.

In addition, the battery pack can be assembled in a process-safe manner, since the two housing elements can be reliably and completely joined together if no separate elastic parts or inserts are used. In particular, upon assembly no air gap remains between the two housing elements, because the two housing elements can in particular be brought fully into bearing contact. In an embodiment in which the two housing elements are screwed together, for example, the respective screw bosses and screw eyes can in particular be brought fully into bearing contact. An elastic insert, as used in the prior art, often prevents the two housing elements from being fully joined together if, for example, the elastic insert is positioned improperly or is selected such that it cannot be elastically deformed to a sufficient degree.

In particular, the battery pack is a battery pack for hand-held power tools. A "battery pack for hand-held power tools" is to be understood to mean, in particular, a battery pack designed to supply electrical power to commercially available hand-held power tools such as, for instance, cordless screwdrivers, cordless hammer drills, cordless angle grinders and the like. The battery pack has at least one battery cell, preferably a plurality of battery cells. These can be interconnected in series and/or in parallel. The at least one battery cell may be, for example, a lithium-ion battery cell having a nominal voltage of, for example, 3.6 V. The battery cell may also be a nickel-cadmium or nickel-metal-hydride cell, or a battery cell having a different cell chemistry. If there is a plurality of battery cells, they may be the same or different. For example, they may have the same or different nominal voltages. They may also have the same or different capacities. In particular, the at least one battery cell has a cylindrical shape. The at least one battery cell may alternatively have a prismatic shape.

Moreover, the battery pack is in particular an interchangeable battery pack. The interchangeable battery pack has an electrical interface unit and a mechanical interface unit for interchangeable electrical and mechanical attachment to a hand-held power tool. The electrical interface unit has, for example, electrical contact elements that, upon the battery pack being attached to the hand-held power tool, effect electrical contacting to the hand-held power tool. For this purpose, the hand-held power tool has a corresponding electrical interface unit. The mechanical interface unit may have, for example, guide rails or other guide elements that act in combination with corresponding guide elements of a corresponding mechanical interface unit of the hand-held power tool. For the purpose of securely fastening the battery pack to the hand-held power tool in a detachable manner, the mechanical interface unit may also have a locking mechanism in which, for example, a locking element of the battery pack engages in a locking recess on the hand-held power tool.

The battery pack according to the disclosure additionally has a cell holder that is designed to receive at least one battery cell. In the case of a battery pack having a plurality of battery cells, the cell holder receives all the battery cells. For this purpose, the cell holder has a corresponding receiver for each battery cell. The receivers for the battery cells are embodied in such a manner that the battery cells are kept spaced apart from each other. This prevents short circuits from occurring as a result of the individual battery cells touching each other. The receivers for the battery cells may be constituted, for example, by ribs that separate the battery cells from each other. The cell holder may also have elastic tabs for receiving the battery cells, the elastic tabs being in particular integrally formed on the cell holder. It is additionally provided that the cell holder be composed, at least partially, of a material that is thermally conductive and electrically insulating, so that heat produced by the battery cells can be better dissipated. Preferably, the cell holder is produced from a corresponding plastic, for example acrylonitrile butadiene styrene (ABS), polycarbonate (PC), polyethylene (PE), polypropylene (PP), polyamide (PA), polybutylene terephthalate (PBT), possibly with an admixture of fillers to improve thermal conductivity. The cell holder may be formed, in particular, from a plastic injection-molded part.

In one design, the cell holder may also be designed to receive a set of battery-pack electronics. The set of battery-pack electronics comprises electrical and electronic components for controlling the battery pack by open-loop ad/or closed-loop control. The set of battery-pack electronics additionally comprises at least one printed circuit board for receiving the electrical and electronic components. The electrical and electronic components may be mounted on the at least one printed circuit board, or be connected in an electrically conductive manner to the at least one printed circuit board. The set of battery-pack electronics comprises, for example, the electrical contact elements of the electrical interface unit of the battery pack. The electrical contact elements may be fastened directly on the printed circuit board of the set of battery-pack electronics, or connected to the printed circuit board via an electrically conductive connection, e.g. a separate electric conductor. For the purpose of receiving the set of battery-pack electronics, in particular the at least one printed circuit board of the set of battery-pack electronics, the cell holder has, in particular, at least one fastening element, e.g. a latching hook, for detachably fastening the set of battery-pack electronics to the cell holder.

There is at least one cell connector provided for connecting the at least one battery cell of the battery pack in an electrically conductive manner to the set of battery-pack electronics. In the case of a plurality of battery cells, individual battery cells may also be interconnected in an electrically conductive manner by cell connectors. The cell connectors in this case effect an electrical connection, in particular, between the terminals of the battery cells, on the one hand, and between the terminals of the battery cells and the set of battery-pack electronics, on the other hand. It is particularly advantageous in this case if at least one terminal of a battery cell is directly connected to a contact element of the set of battery-pack electronics via a cell connector, such that there is both an electrical and mechanical connection effected between the individual battery cells and the set of battery-pack electronics. It is thus possible to dispense with additional contacting of the individual battery cells to the set of battery-pack electronics via a separate electric conductor. In one design, the cell holder has holding elements for fixing the cell connectors in place.

In one embodiment, the first housing element, realized as a two-component part, is in the form of a shell. It receives the at least one battery cell, at least partially. If there is a plurality of battery cells provided in the battery pack, the first housing element may also receive a plurality of battery cells, at least partially. The first housing element in the form of a shell may be realized, for example, such that a height of the first housing element is less than a diameter of the battery cell. In this case the first housing element in the form of a shell receives the battery cell, or plurality of battery cells, at least partially. The height of the first housing element may also be greater than the diameter of the battery cell. The first housing element in the form of a shell then receives the battery cell, or plurality of battery cells, completely.

For the purpose of detachably fastening the first housing element to the second housing element, the first housing element has at least one fastening element that acts in combination with a corresponding fastening element on the second housing element. There may also be a plurality of fastening elements, e.g. four, provided on the first housing element, that effects a mechanical connection to a corresponding number of corresponding fastening elements on the second housing element. In the case of a screwed connection between the first and the second housing element, the fastening elements may be realized as screw bosses and screw eyes. In each case, one screw eye and one screw boss receive one fastening screw. In the case of a snap connection, or latching connection, between the two housing element, the fastening elements may be realized as latching springs, or latching hooks and latching projections.

Preferably, the first hard component element of the first housing element realized as a two-component part is realized as a cell carrier element that, in the assembled state, bears under preload against the at least one battery cell. The cell carrier element is preferably shaped as a flat, or plate-like, housing element. In particular in this case, the cell carrier element is arranged substantially parallel to a longitudinal extent of the at least one battery cell. An inner surface of the cell carrier element serves in this case as a bearing contact surface, or support surface, for one or more battery cells. An outer surface of the cell carrier element serves as an outer surface of the battery pack, and thereby constitutes a region, or portion, of the outer housing. The outer surface of the cell carrier element may serve, for example, as a standing surface for the battery pack.

To enable the cell carrier element to bear against the one or more battery cells, the cell carrier element preferably has one or more receivers for the one or more battery cells. The receivers are preferably adapted to the shape of the battery cells, such that the cell carrier element can bear against the surface of one or more battery cells. The receivers may be shaped so as to at least partially complement the shape of the battery cells, such that the cell carrier element can bear at least partially with surface contact against of one or more battery cells. Thus, for example, if cylindrical battery cells are used, the shape of the receivers may be adapted to the shape of cylindrical battery cells. In particular, these receivers are of an elongate design. They may be of a length that corresponds substantially to the length of a battery cell. They may also be longer or shorter than a battery cell. The receivers for the battery cells are preferably groove-shaped. In this case they have an arc-shaped cross-section. This geometric shape of the receivers allows the cell carrier element to bear at least partially with surface contact against the envelope of the cylindrical battery cells. If prismatic cells such as, for example, pouch cells are used, the receivers may be adapted accordingly to the prismatic shape of the battery cells and shaped, for example, so as to be complementary to the prismatic cells.

The second hard component element of the first housing element realized as a two-component part is preferably realized as a housing frame element. The housing frame element is realized in the form of a frame. An outer surface of the housing frame element serves as an outer surface of the battery pack, and thereby constitutes a region, or portion, of the outer housing. The housing frame element has at least one side element, in particular four side elements that at least partially constitute side walls of the outer housing. The housing frame element may additionally have at least one base element, in particular a plurality of base elements that at least partially constitute a base of the outer housing. There is an edge realized between a side element and a base element. In the case of a housing frame element having four side elements and four base elements, four edges are realized. Accordingly, the housing frame element may have at least one edge, in particular four edges.

In a preferred design, the housing frame element comprises the at least one fastening element for detachably fastening the first housing element to the second housing element. As an example, the housing frame element has four fastening elements.

Preferably, the at least one soft component element of the first housing element realized as a two-component part is realized circumferentially around the first hard component element. In an embodiment in which the first component element is embodied as a plate-like cell carrier element, the soft component element constitutes a circumferential frame around the cell carrier element. Moreover, the second hard component element is realized circumferentially around the at least one soft component element. If the second hard component element is constituted by a housing frame element, the housing frame element surrounds the frame-type soft component element. In this way, the first hard component element can be arranged within the second hard component element. The soft component element is arranged between the first and the second hard component element. It is injection-molded onto the first and the second hard component element, or injection-molded between the first and the second hard component element, in such a manner that the two hard component elements do not realize a stiff connection with respect to each other.

The at least one soft component element may have at least one receiver, preferably a plurality of receivers, for the at least one or more battery cells. The receivers are preferably adapted to the shape of the battery cells, such that the soft component element can bear at least partially with surface contact against one or more battery cells. Thus, for example, if cylindrical battery cells are used, the shape of the receivers may be adapted to the shape of cylindrical battery cells. The receivers may be shaped, in particular, so as to be complementary to the shape of the battery cells. The receivers for cylindrical battery cells are, in particular, arc-shaped, such that they can bear against the cylinder-shaped battery cells. The receivers may also be adapted for other shapes of battery cells, for example prismatic battery cells.

In a further design, the at least one soft component element has at least one edge protection element, preferably a plurality of edge protection elements. In particular in this case, the edge protection element is integrally injection-molded onto the soft component element. Moreover, in this case the edge protection element is injection-molded onto the second hard component element in such a manner that the soft component element is injection-molded over or around edges of the second hard component element. The edge protection element thus provides protection to the edges of the second hard component element. The edge protection element in this case may be injection-molded, in the region of the edges, on an inner surface and/or on an outer surface of the second hard component element. The edge protection element thus provides protection to the edges from the inside and/or outside.

In one embodiment, the second hard component element may have at least one delimiting element that is designed to delimit the movement of the first hard component element relative to the second hard component element. The at least one delimiting element is formed, in particular integrally, onto the second hard component element. It constitutes, in particular, a projection on the second hard component element. The delimiting element engages underneath the first hard component element, being spaced apart from it. The delimiting element and the first hard component element are arranged relative to each other such that, in a basic state without preload, the delimiting element is arranged spaced apart from the first hard component element. Moreover, the delimiting element and the first hard component element are arranged relative to each other such that, in a state with relatively little preload, the delimiting element is arranged spaced apart from the first hard component element, relatively little preload being understood to mean a preload that was provided for, or taken into account, in the design of the battery pack and that lies within the tolerances to be expected, or permitted. Finally, the delimiting element and the first hard component element are arranged relative to each other such that only in a state of relatively high, in particular unexpectedly high or excessive, preload does the first hard component element come to bear against the delimiting element, as a result of which the soft component element cannot be further stretched and the first hard component element cannot move further with respect to the second hard component element. The delimiting element thus prevents there being excessive deflection of the first hard component element with respect to the second hard component element. This is to prevent excessive preload from occurring during assembly of the battery pack, which could result in excessive stress on the soft component element. The delimiting element therefore protects against excessive expansion of the soft component element due to excessive movement of the first hard component element relative to the second hard component element.

BRIEF DESCRIPTION OF THE DRAWINGS

The disclosure is described in greater detail in the following on the basis of the drawings listed below. There are shown FIG. 1 a schematic view of a hand-held power tool with a battery pack, FIG. 2 an exploded representation of a battery pack, FIG. 3 a perspective view of a battery pack according to the disclosure, in longitudinal section, FIG. 4 a top view of the first housing element of the battery pack according to FIG. 3, FIG. 5 an exploded view of the first housing element according to FIG. 4, FIG. 6 a partially exploded view of an alternative first housing element, FIG. 7 a longitudinal section, in an exploded view, of an alternative embodiment of the battery pack, FIG. 8 a longitudinal section of an alternative embodiment of the battery pack, in a schematic representation.

DETAILED DESCRIPTION

Figure 1:
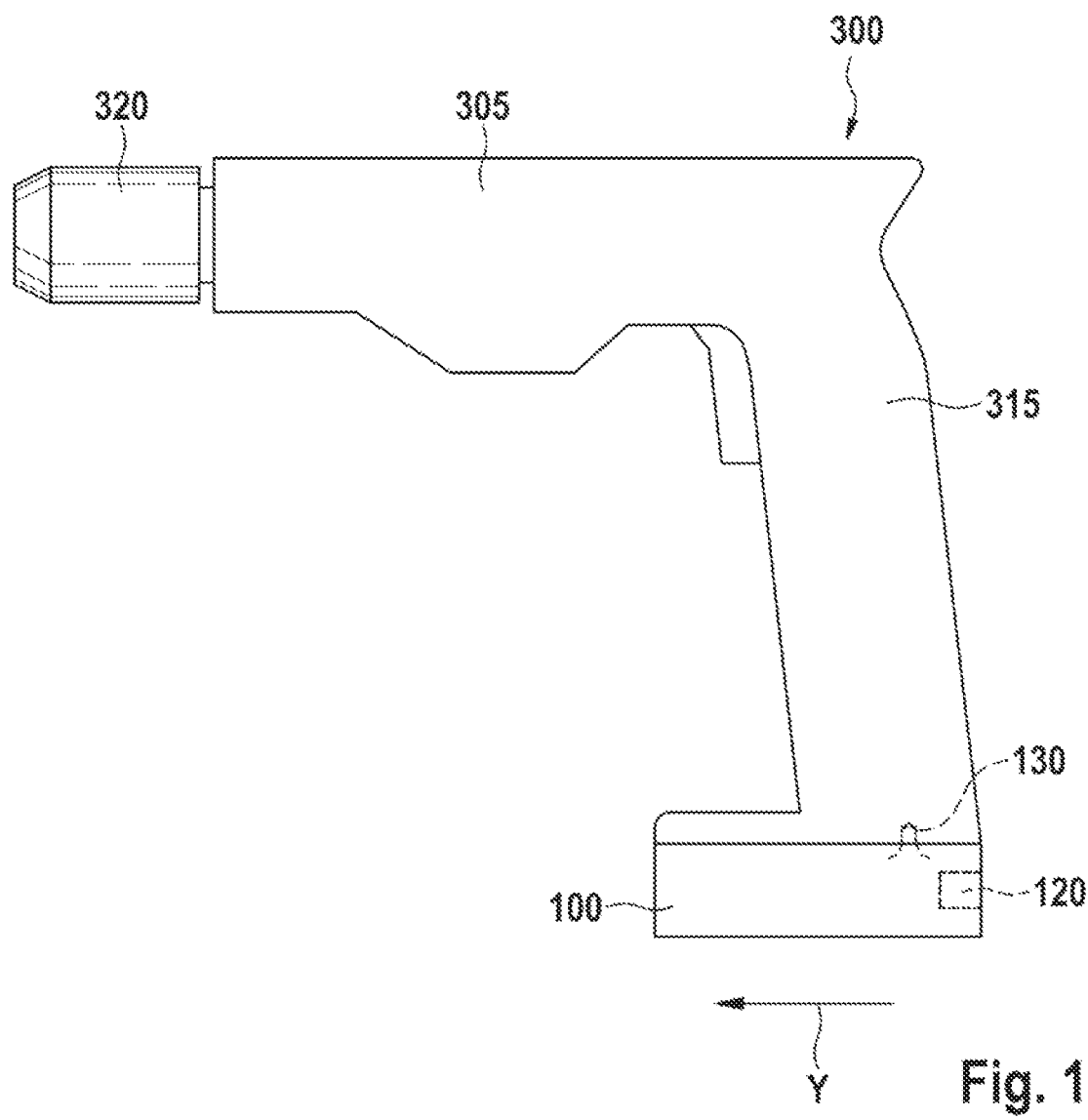

FIG. 1 shows an electrical appliance realized as a hand-held power tool 300. According to the embodiment represented, the hand-held power tool 300 can be mechanically and electrically connected to a battery pack 100 for off-mains electric power supply. In FIG. 1, the hand-held power tool 300 is realized, by way of example, as a cordless drill/screwdriver. It is to be noted, however, that the present disclosure is not limited to cordless drill/screwdrivers, but rather can be applied to various hand-held power tools 300 that are operated with a battery pack 100. The hand-held power tool 300 has a main body 305, to which a tool receiver 320 is fastened, and has a handle 315, on which a battery pack 100 according to the disclosure is arranged in a locked manner. In the embodiment represented, the battery pack 100 is realized as a sliding battery pack.

The battery pack 100 has a mechanical interface unit 105 (FIG. 2) for interchangeably attaching the battery pack 100 to the hand-held power tool 300. The interface unit 105 comprises guide elements 110, in the form of guide rails, that act in combination with corresponding receiving elements of the hand-held power tool 300. In the attaching of the battery pack 100, the receiving elements (not represented) of the hand-held power tool 300 are brought into engagement with the guide elements 110 of the battery pack 100, with the battery pack 100 being inserted in a sliding direction y along the receiving elements. The interface unit 105 additionally comprises a locking mechanism, in which a locking element 130 of the battery pack 100 engages in a locking recess (not represented) on the hand-held power tool. An actuating element 120 is provided for releasing the locking element 130. In the position shown in FIG. 1, the battery pack 100 is fastened to the handle 315 of the hand-held power tool 300 and locked by the locking element 130. The battery pack 100 can be detached from the handle 315 of the hand-held power tool 300 by actuation of the actuating element 120. After the battery pack 100 has been unlocked it can be separated from the hand-held power tool 300. For the purpose of electrically contacting the battery pack 100 to the hand-held power tool 300, an electrical interface unit 155 is provided with electrical contact elements 150 that act in combination with corresponding contact means (not represented) on the hand-held power tool 300.

Figure 2:
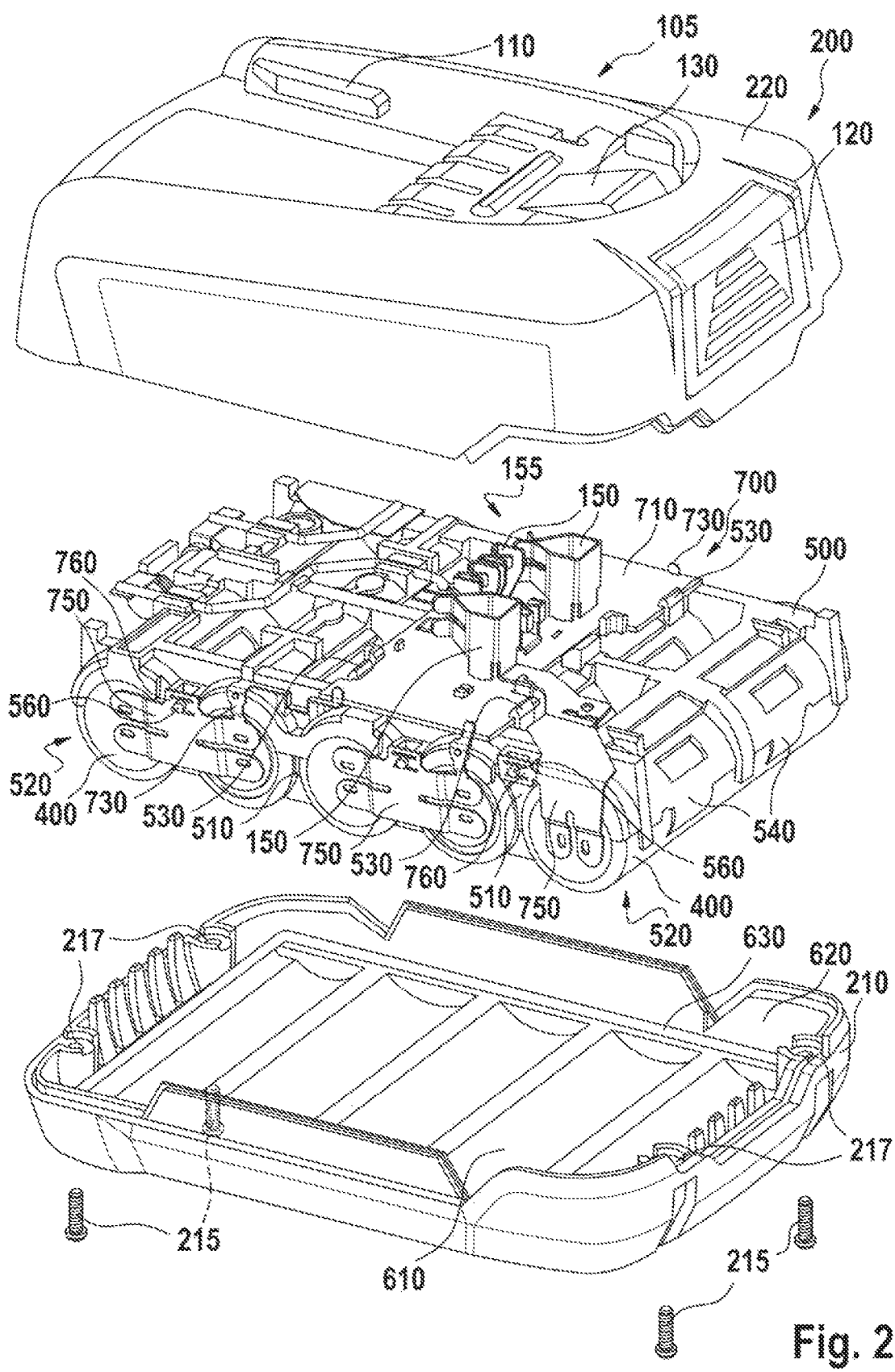
Figure 3:
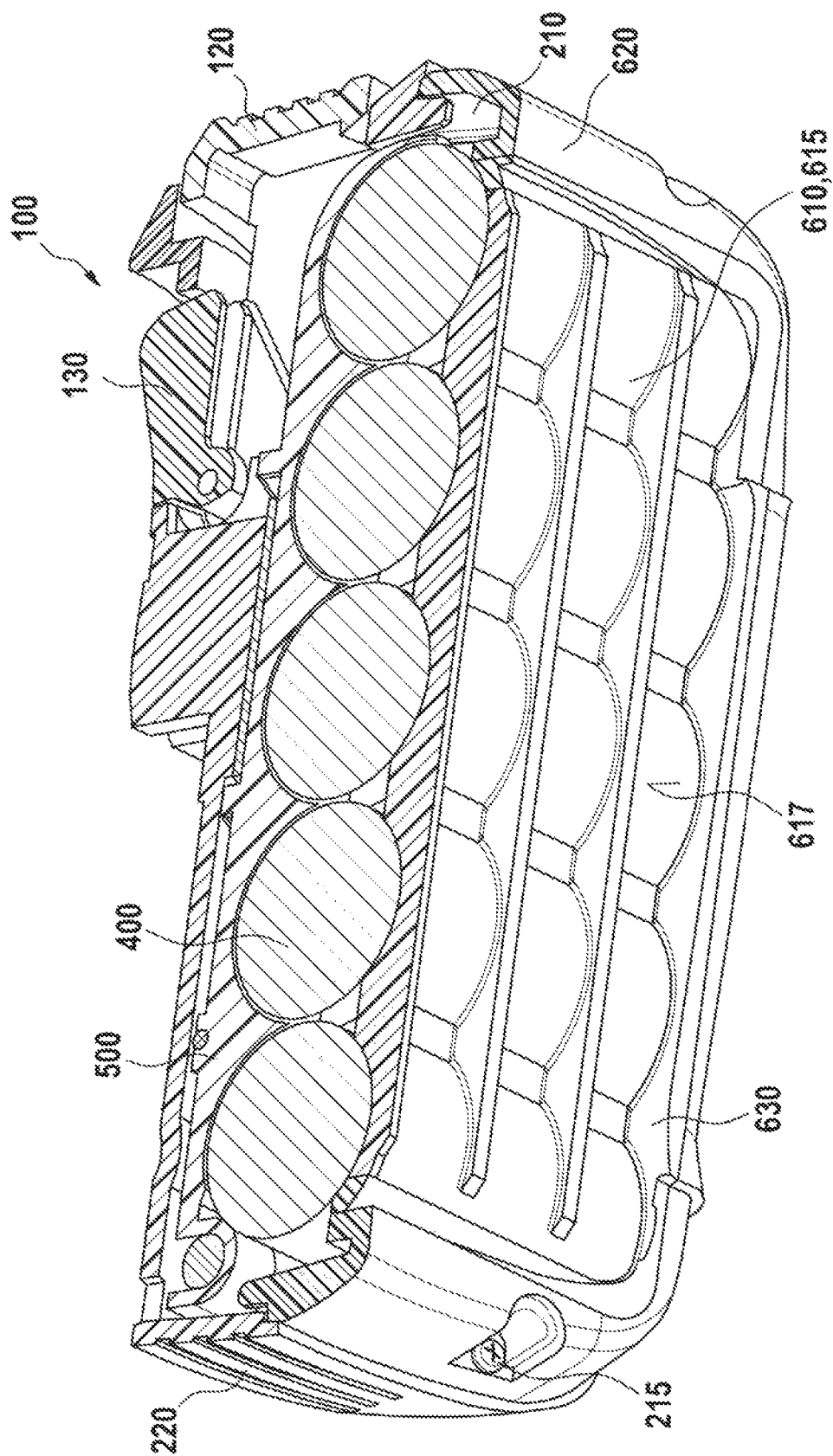
Figure 4:
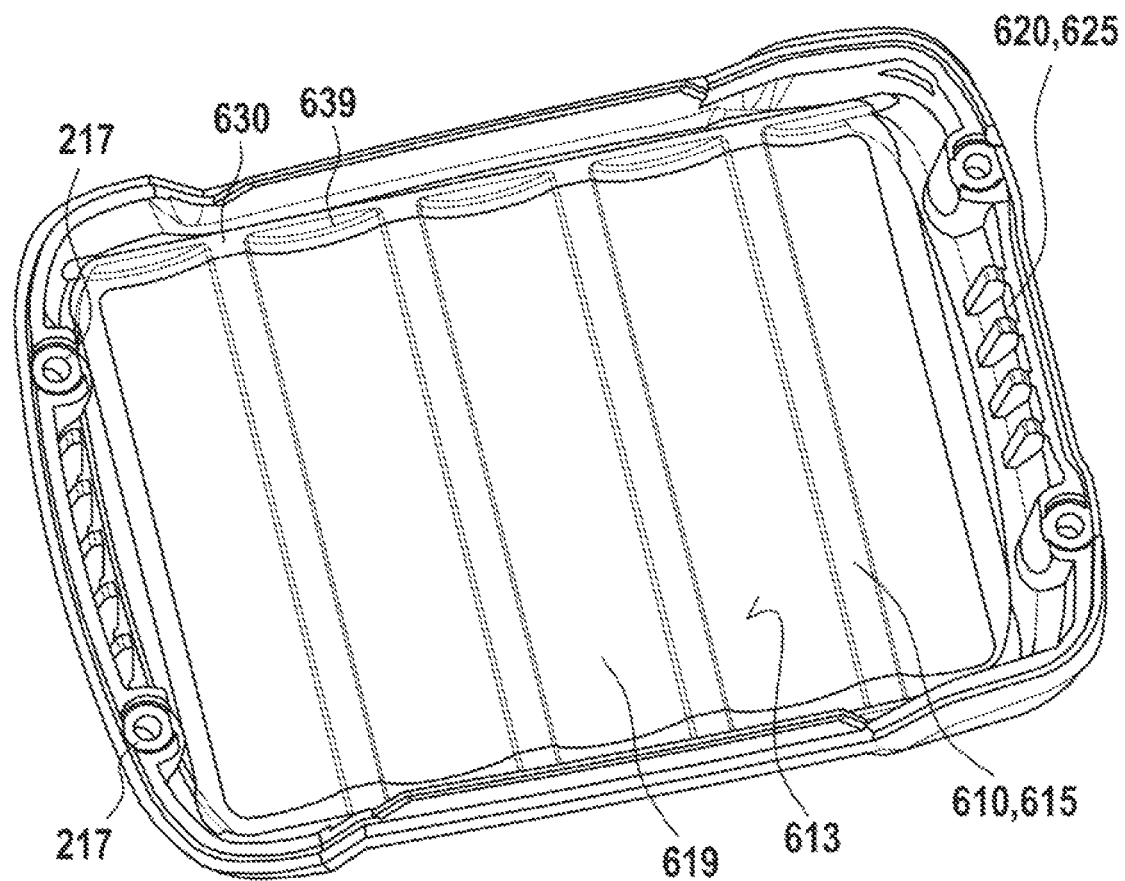
Figure 5:
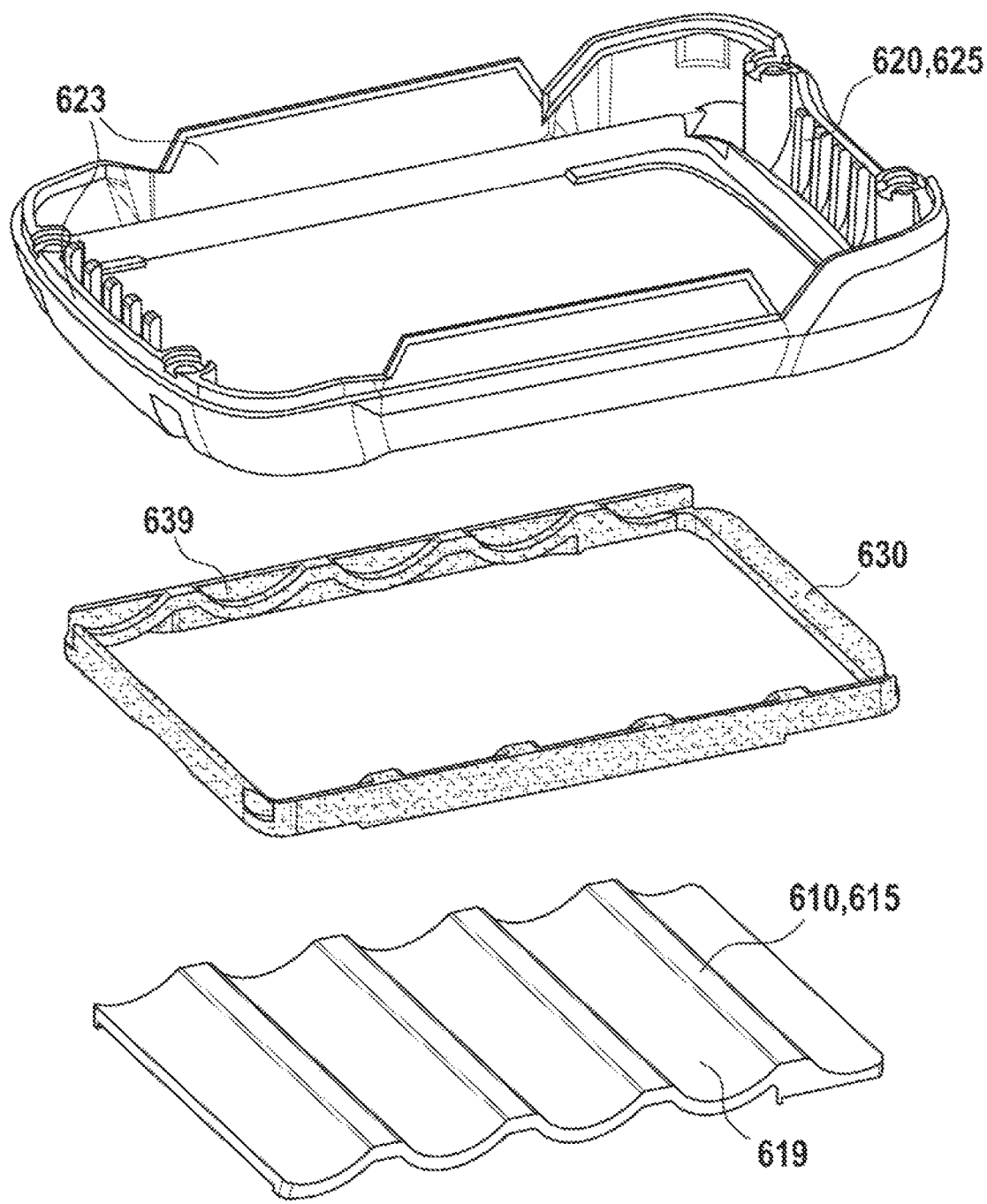

As represented in FIG. 2, which is an exploded representation of an embodiment of the battery pack 100 according to the disclosure, the battery pack 100 has an outer housing 200 composed of a first housing element 210 and of a second housing element 220. Here, the two housing elements 210 and 220 are detachably connected to each other by four screws 215. To receive the screws 215, the first housing element 210 has four screw eyes 217, and the second housing element 220 has four screw bosses 227 (see FIG. 7).

The outer housing 200 receives a cell holder 500 that has a plurality of battery cells 400, represented here with five battery cells 400. In the embodiment represented, the battery cells 400 have a cylindrical shape. The cell holder 500 serves to mechanically fix in place the battery cells 400, which are arranged spaced apart from each other on the cell holder 500. For this purpose, the cell holder 500 has a corresponding receiver 520 for each battery cell 400. The receivers 520 are constituted by ribs 510 that are formed onto the cell holder 500 in such a manner that two adjacent battery cells 400 are separated and mutual electrical insulation of the individual battery cells 400 can be provided. The cell holder 500 has elastic tabs 540 as an additional means of fixing the battery cells 400 in place on the cell holder 500. Here, the cell holder 500 is formed from a plastic injection-molded part.

Moreover, in the embodiment represented here, the cell holder 500 has a set of battery-pack electronics 700, which is fastened to the cell holder 500. The set of battery-pack electronics 700 comprises electrical and electronic components for controlling the battery pack 100 by open-loop ad/or closed-loop control. The electrical and electronic components are mounted on a printed circuit board 710, or are otherwise connected to the printed circuit board 710 in an electrically conductive manner, for example via an electric conductor. The connection between the printed circuit board 710 of the set of battery-pack electronics 700 and the cell holder 500 is provided by fastening elements 530, realized here as latching hooks. Fastened on the printed circuit board 710, inter alia, are the contact elements 150 for effecting an electrical connection between the battery pack 100 and the hand-held power tool 300. Also, by means of the set of battery-pack electronics 700, the state of charge can be monitored, on the basis of the voltage of the individual battery cells 400, and controlled by means of a corresponding closed-loop control. Moreover, individual cells can be monitored, individual battery cells 400 being directly connected to the set of battery-pack electronics 700 by means of contact tongues 730, for example via a soldered connection. Further components, such as temperature sensor, fuse cut-out, may be provided.

Cell connectors 750 are provided for connecting the battery cells 400 to the set of battery-pack electronics 700, and interconnecting the battery cells 400, in an electrically conductive manner. In the embodiment represented, according to FIG. 2, the terminals of the individual battery cells 400 are interconnected via cell connectors 750 and, because of the series connection represented, in each case two battery cells 400 are interconnected via a cell connector 750 and one battery cell 400 is directly connected to the contact element 150 of the set of battery-pack electronics 700 via a cell connector 750. The cell connectors 750 additionally have wing-type holding elements 760 for fixing the cell connectors 750 in place on the cell holder 500. There are pin-type holding elements 560 formed onto the cell holder 500 for this purpose.

FIGS. 3 to 7 show further designs of the battery pack 100 according to the disclosure. The first housing element 210 is constituted by a two-component part. The first housing element 210 in this case constitutes an integrated part composed of a plurality of elements. It has a first hard component element 610, e.g. of polyamide, a second hard component element 620, e.g. of polyamide, and a soft component element 630, e.g. of a thermoplastic polymer, the first hard component element 610 and the second hard component element 620 being fixedly connected to each other via the soft component element 630. The first housing element 210 is produced by bi-injection molding. It is realized in the form of a shell. In this embodiment of the battery pack 300 according to the disclosure, the first housing element 210 and the second housing element 220, which are screwed together by means of the screws 215, are connected to each other in such a manner that the battery cells 400 are held under preload in the outer housing 200 by means of the soft component element 630.

The first hard component element 610 is realized as a cell carrier element 615 that, in the assembled state, bears under preload against the battery cells 400. In the assembled state, the cell carrier element 615 is firmly pressed against the battery cells 400, thereby causing the battery cells 400 to be fixed in place in the outer housing 200. The cell carrier element 615 is formed as a flat, or plate-like, hard component element 610. An inner surface 613 of the cell carrier element 615 bears against the battery cells 400. An outer surface 617 of the cell carrier element 615 constitutes an outer surface of the battery pack 100. The outer surface 617 may serve, for example, as a standing surface for the battery pack 100. The cell carrier element 615 has receivers 619 for the battery cells 400. In the embodiment represented, the receivers 619 have an arc-shaped cross-section, corresponding to the cylindrical battery cells 400, which allows the cell carrier element 615 to bear with surface contact against the envelope of the cylindrical battery cells 400.

The second hard component element 620 of the first housing element 210 is realized as a housing frame element 625. It is realized in the form of a frame and has four side elements 623.

The soft component element 630 is realized circumferentially around the first hard component element 610. Moreover, the second hard component element 620 is realized circumferentially around the soft component element 630. In this way, the first hard component element 610 is arranged within the second hard component element 620. In other words, the soft component element 630 is arranged between the first hard component element 610 and the second hard component element 620. In the embodiment represented, the soft component element 630 has a plurality of arc-shaped receivers 639 for the cylinder-shaped battery cells 400.

Figure 6:
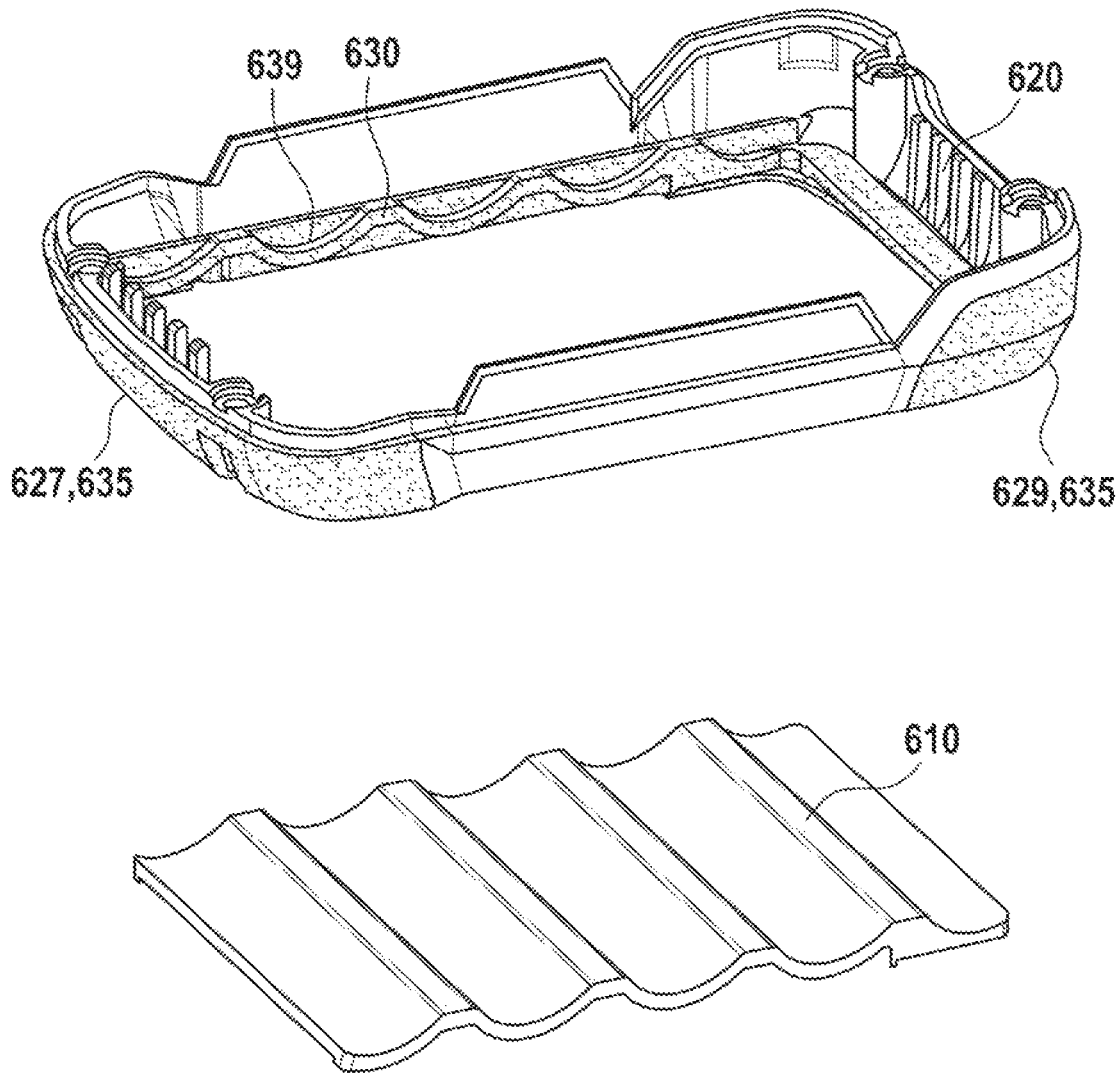

In the embodiment represented, according to FIG. 6, the soft component element 630 has a plurality of edge protection elements 635. For easier identification, the soft component element 630 is represented with shading in FIG. 6 (as also in FIG. 5). The edge protection elements 635 are integrally injection-molded onto the soft component element 630, being injection-molded onto the second hard component element 620 in such a manner that the soft component element 630 is injection-molded over, or around, the edges 627 and corners 629 of the second hard component element 620 in order to protect them.

Figure 7:
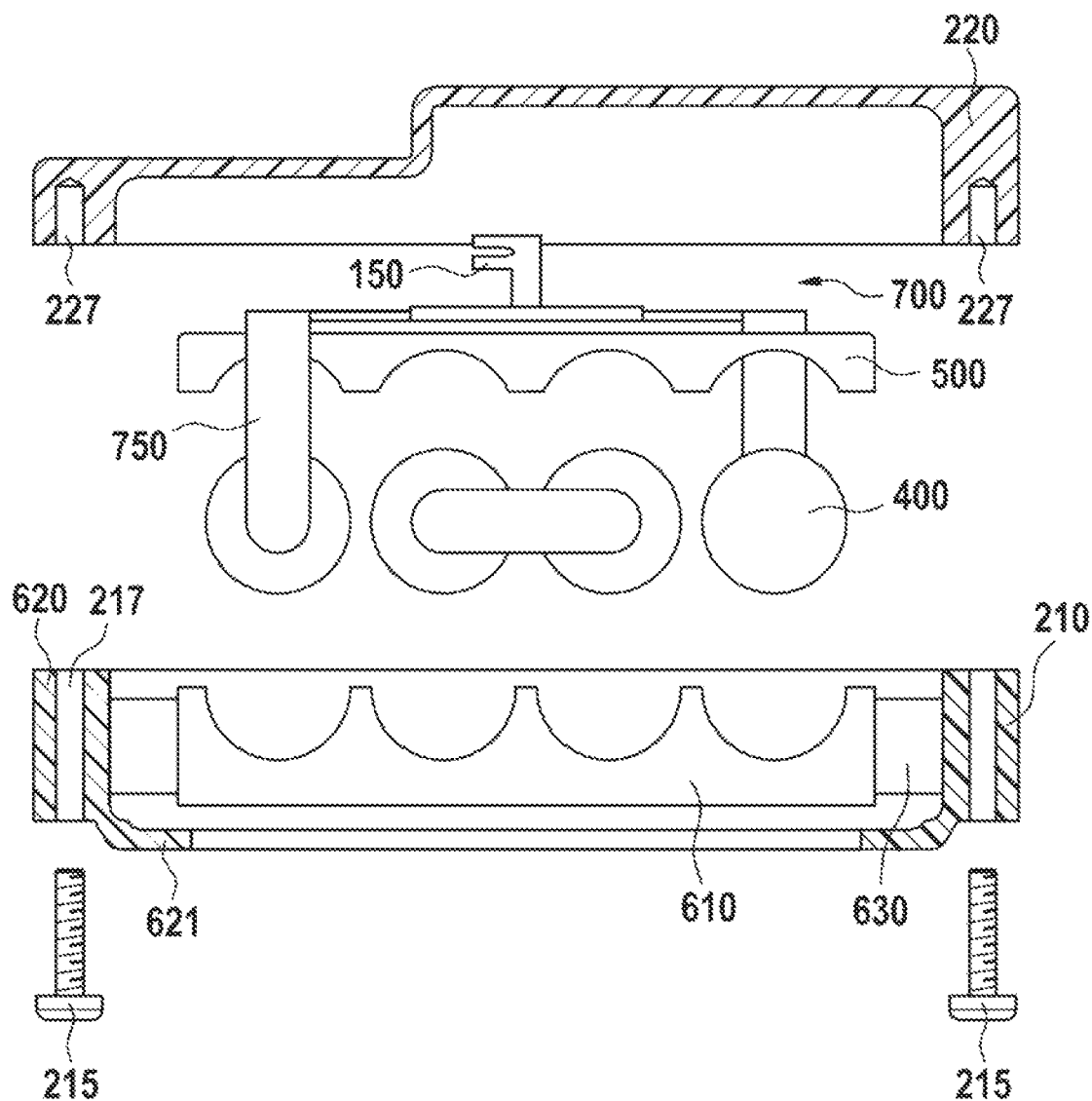

In the schematic view according to FIG. 7, the second hard component element 620 has a delimiting element 621 that is designed to delimit the movement of the first hard component element 610 relative to the second hard component element 620. The delimiting element 621 is, for example, integrally formed onto the second hard component element 620. It constitutes a projection on the second hard component element 620, in such a manner that it engages underneath the first hard component element 610. FIG. 7 shows a basic state. In this basic state, the soft component element 630 is in a substantially non-stressed state. There is no preload acting upon the first hard component element 610. In this basic state, the first hard component element 610 is spaced apart from the delimiting element 621. The delimiting element 621 is spaced apart relative to the first hard component element 610 so as to allow relative movement of the first hard component element relative to the second hard component element to a certain predefined extent. However, if the first hard component element 610 were to deflect very considerably, i.e. excessively, relative to the second hard component element 620, the deflection would be delimited (downwards in FIG. 7) by the delimiting element 621.

Figure 8:
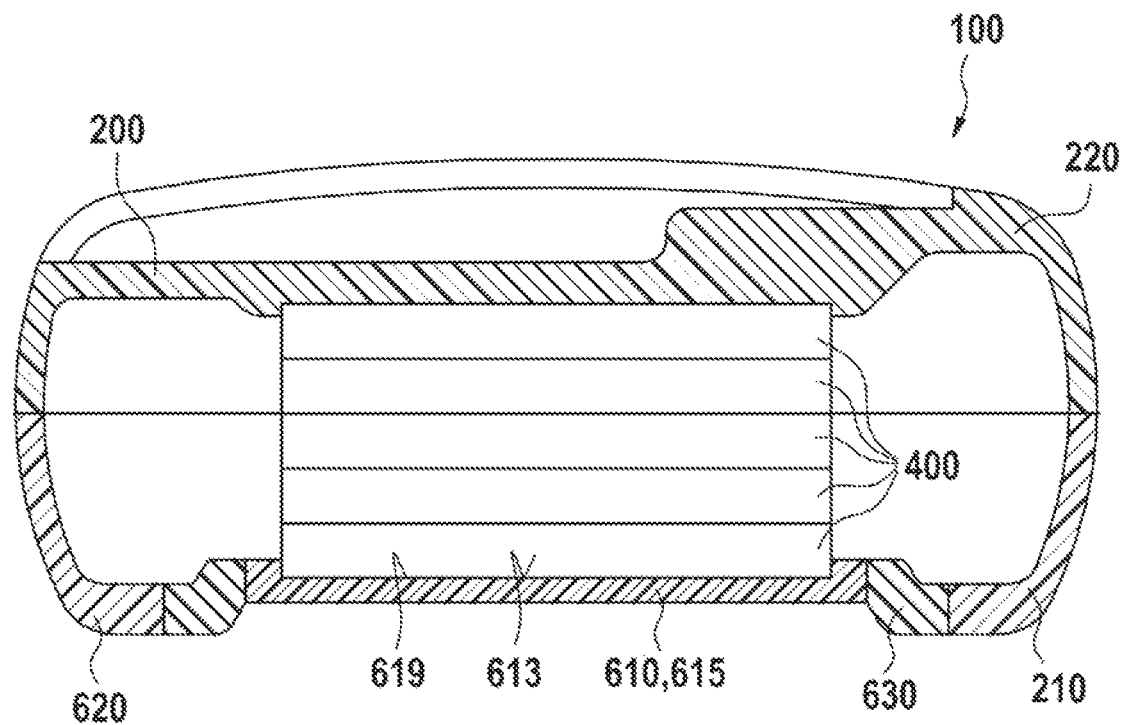

An alternative embodiment of a battery pack 100 having prismatic battery cells 400' is shown in schematic and highly simplified form in FIG. 8. The first housing element 210 is constituted by a two-component part. It has a first hard component element 610, e.g. of polyamide, a second hard component element 620, e.g. of polyamide, and a soft component element 630, e.g. of a thermoplastic polymer, the first hard component element 610 and the second hard component element 620 being fixedly connected to each other via the soft component element 630. The first housing element 210 is produced by bi-injection molding. The first housing element 210 and the second housing element 220 are connected to each other in such a manner that the battery cells 400' are held under preload in the outer housing 200 by means of the soft component element 630. The first hard component element 610 is realized as a cell carrier element 615 that, in the assembled state, bears under preload against the battery cells 400'. In the assembled state, the cell carrier element 615 is firmly pressed against the battery cells 400', thereby causing the battery cells 400' to be fixed in place in the outer housing 200. The cell carrier element 615 is formed as a flat, or plate-like, hard component element 610. An inner surface 613 of the cell carrier element 615 bears against what in FIG. 8 is the lowermost battery cell 400' of the battery cell stack. The cell carrier element 615 has receivers 619 for the battery cells 400'. In the embodiment represented, the receivers 619 are of a shape that is complementary to the prismatic shape of the battery cells 400' and that allows the cell carrier element 615 to bear with surface contact against what in FIG. 8 is the lowermost prismatic battery cell 400'.

What is claimed is:

1. A battery pack comprising:
   at least one battery cell;
   an outer housing that has at least one first housing element and at least one second housing element; and
   a cell holder received between said at least one first housing element and said at least one second housing element, said cell holder configured to receive the at least one battery cell, wherein the at least one first housing element includes at least one first hard component element, a second hard component element, and at least one soft component element, the at least one first hard component element and the second hard component element fixedly elastically connected to each other via the at least one soft component element, so that the at least one first hard component element and the second hard component element are movable relative to each other, wherein the at least one second housing element is detachably connected to the at least one first housing element such that the at least one battery cell is held under preload in the outer housing by the at least one soft component element.

2. The battery pack according to claim 1, wherein the at least one first housing element is realized in the form of a shell and at least partially receives the at least one battery cell.

3. The battery pack according to claim 1, wherein the at least one second hard component element is realized as a housing frame element and comprises at least one fastening element configured to detachably fasten the at least one first housing element to the at least one second housing element.

4. The battery pack according to claim 3, wherein the housing frame element has four edges.

5. The battery pack according to claim 1, wherein the at least one first hard component element is realized as a cell carrier element that bears under preload against the at least one battery cell.

6. The battery pack according to claim 5, wherein the cell carrier element has at least one receiver for the at least one battery cell.

7. The battery pack according to claim 5, wherein the cell carrier element is arranged substantially parallel to a longitudinal extent of the at least one battery cell.

8. The battery pack according to claim 1, wherein the at least one soft component element is realized circumferentially around the at least one first hard component element.

9. The battery pack according to claim 1, wherein the second hard component element is realized circumferentially around the at least one soft component element.

10. The battery pack according to claim 1, wherein the at least one soft component element has at least one arc-shaped receiver for the at least one battery cell.

11. The battery pack according to claim 1, wherein the at least one soft component element has at least one edge protection element.

12. The battery pack according to claim 1, wherein the second hard component element has at least one delimiting element configured to delimit movement of the at least one first hard component element relative to the second hard component element.

* * * * *